US005499146A

United States Patent [19]
Donahue et al.

[11] Patent Number: 5,499,146
[45] Date of Patent: Mar. 12, 1996

[54] METHOD AND APPARATUS FOR RECORDING IMAGES FOR A VIRTUAL REALITY SYSTEM

[75] Inventors: Daniel M. Donahue; Dale A. Cone, both of Garland, Tex.

[73] Assignee: Texas Instruments Incorporated, Dallas, Tex.

[21] Appl. No.: 248,297

[22] Filed: May 24, 1994

[51] Int. Cl.$^6$ ................................................. H04N 5/78
[52] U.S. Cl. ........................................ 360/33.1; 358/335
[58] Field of Search .......................... 360/33.1, 8, 11.1, 360/18; 348/218, 213, 121, 51, 47, 705, 588, 584; 364/424.01

[56] References Cited

U.S. PATENT DOCUMENTS

| | | | |
|---|---|---|---|
| 4,312,625 | 3/1982 | Smith | 348/213 X |
| 4,463,380 | 7/1984 | Hooks, Jr. | 348/121 |
| 5,159,455 | 10/1992 | Cox et al. | 348/218 |
| 5,166,878 | 11/1992 | Poelstra | 364/424.01 |
| 5,193,000 | 3/1993 | Lipton et al. | 348/51 X |

FOREIGN PATENT DOCUMENTS 0583711  4/1993  Japan .

*Primary Examiner*—Andrew L. Sniezek
*Attorney, Agent, or Firm*—W. Daniel Swayze, Jr.; W. James Brady, III; Richard L. Donaldson

[57] ABSTRACT

A 360 degree scene is obtained by image generating devices. These image generating devices obtain a plurality of different video images, each of the image generating devices obtain a different video image of a different field of view of the scene. These different video images are sequentially recorded for use in a virtual reality system.

6 Claims, 6 Drawing Sheets

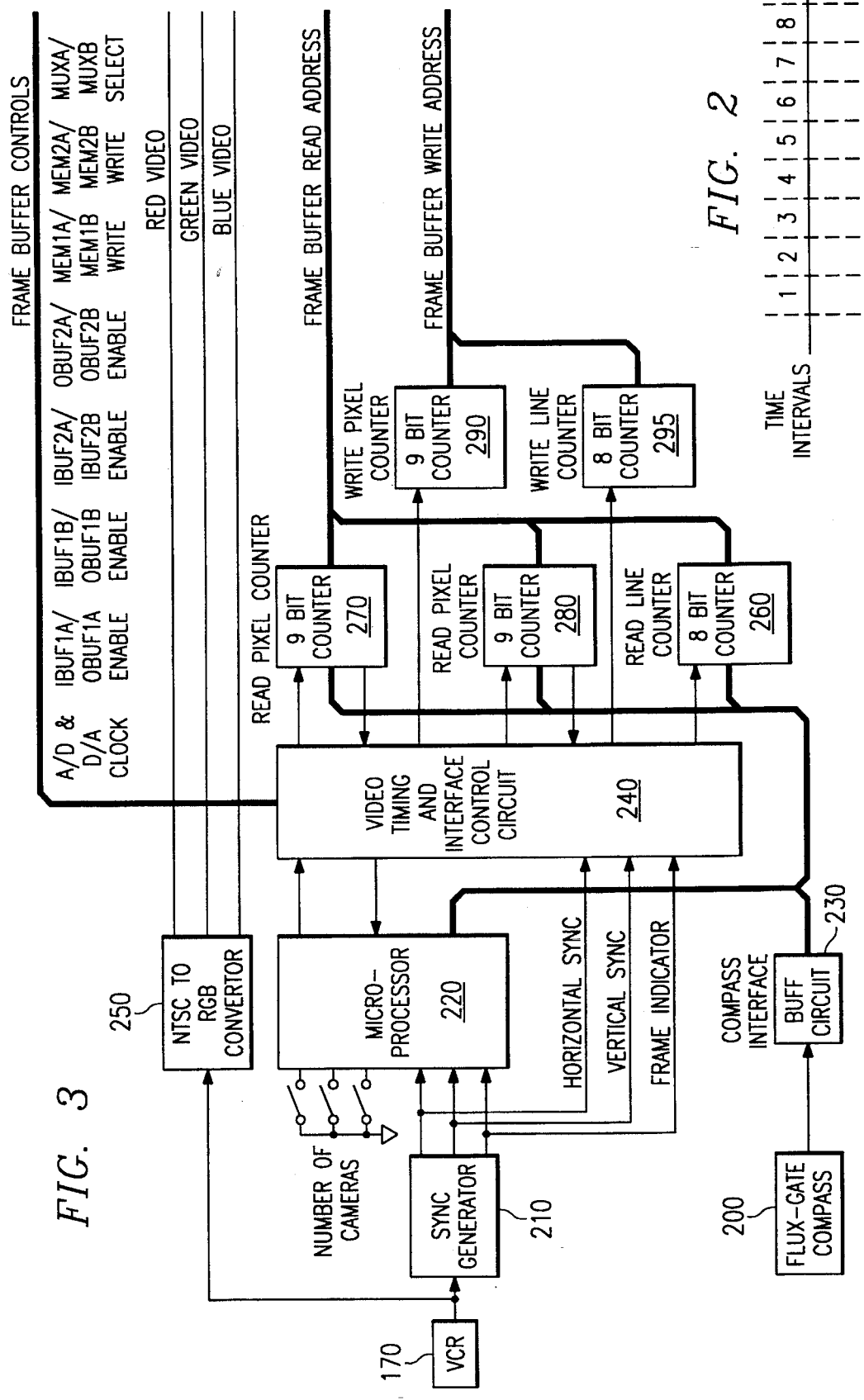

METHOD AND APPARATUS FOR RECORDING IMAGES FOR A VIRTUAL REALITY SYSTEM

TECHNICAL FIELD OF THE INVENTION

This invention relates to the recording of video images and more particularly to the recording of video images for a virtual reality environment.

BACKGROUND OF THE INVENTION

Recent advances in hardware and software have permitted an increased awareness and development effort in the area of interactive "synthesized" environments. The goal of this development effort is to provide a synthesized environment which is so realistic as to be virtually indistinguishable from the absolute or actual reality. The application of these inner-related synthesized realities are diverse: vehicle simulation, preconstruction, architectural review and walk-through, video game-like entertainment, molecular mapping and engineering, microsurgery, communication and educational applications.

The use of the vehicle simulator which may simulate the operation of vehicles, such as race cars and aircraft, for entertainment is becoming widespread. Also, the apparatus which simulates the operation of vehicles are increasingly being used as training devices for government and industry vehicle operators. Such apparatus may be programmed to realistically simulate the motion of the vehicle through two or three-dimensional space which also can provide relatively realistic simulation of the control of the vehicle. Importantly, it is safe and more cost effective for a person to be entertained or trained on a video simulator, as compared with the real vehicle. However, one area that has been substantially overlooked is a method and apparatus for recording and displaying real images that can be used with a virtual reality system.

SUMMARY OF THE INVENTION

The present invention provides a virtual reality environment using real images that have been recorded and are displayed at a reduced cost as compared with computer generated or other high performance systems. The present invention provides a method and apparatus for collecting and recording this video information from real images that have been prerecorded. Thus, the present invention provides a more realistic virtual reality environment since real images which have been prerecorded are displayed in accordance with the movement of the user. For example, images of a roller coaster ride, a car race, a balloon ride, a Grand Canyon white water expedition can be prerecorded to provide a thrill seeking activity. These prerecorded images can be displayed, for example, in a full-head device, for example a headset having N display screens approximating, for example 120 degrees of a field of view. Included within the full-head device is a menu for selecting any of these "thrill seeking experience." Once the user has selected from the menu, the user can realistically view the roller coaster ride, the car race, the balloon ride, or the grand-canyon white water expedition. However, since the present invention simultaneously records video of the activity that includes a full 360 degrees, the user is not limited to merely sitting passively and viewing the prerecorded images. The user may interact with the presentation in that the user is able to view any object which may interest the user. For example, while viewing the prerecorded images, the user may notice off to one side of his field of vision an interesting object, and the user may choose to view this object more closely by viewing the object in the center of his field of vision. The user is able to turn his head; the prerecorded images change and this object is placed into the center of his field of vision, providing a realistic experience. Additionally, if the user desires to view a scene that is occurring behind his head, the viewer may turn his head 180 degrees and realistically view this scene which had been previously behind his head. The present invention provides a method and apparatus for recording and displaying images, for example, on a VCR, providing a full 360 degree field of vision to a user through actual video and taking into account the movement of the user while being displayed.

The present invention includes a system for sequentially recording a sequence of video images, including circuitry for obtaining a plurality of different video images, each of the different video images being of a different field of view to form a 360 degree scene, circuitry for controlling said circuitry for obtaining the plurality of different video images, to select a portion of the plurality of different video images corresponding to a selected number of the plurality of different video images, circuitry to output the portion of said plurality of different video images corresponding to the selected number of said plurality of said different video images circuitry to sequentially record the portion of the plurality of different video images corresponding to the selected number of the plurality of different video images to form the sequence of video images.

DESCRIPTION OF THE DRAWINGS

For a more complete understanding of the present invention, and the advantages thereof, reference is now made to the following description taken in conjunction with the accompanying drawings in which:

FIG. 2 is a timing diagram illustrating time interval and the frame/line sequence to be recorded.

FIG. 3 is a circuit diagram of the present invention illustrating a portion of the playback and display circuit for frame-by-frame display;

DETAILED DESCRIPTION OF THE INVENTION

The present invention and its advantages are best understood by referring to FIGS. 1–9 of the drawings, like numerals being used for like and corresponding parts of the various drawings.

Figure 1:
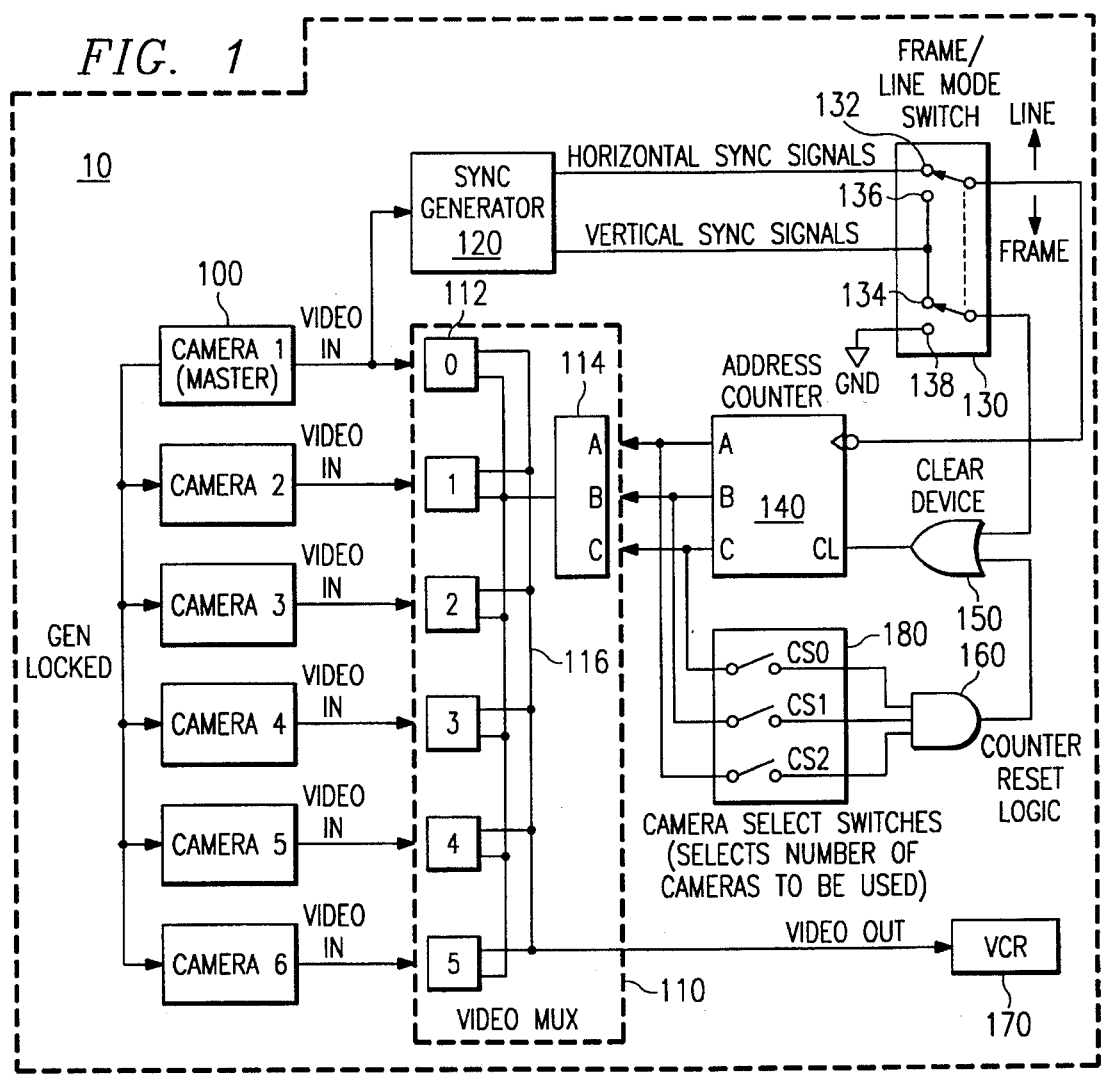
FIG. 1 is a circuit diagram of the video recording system of the present invention.
Figure 9:
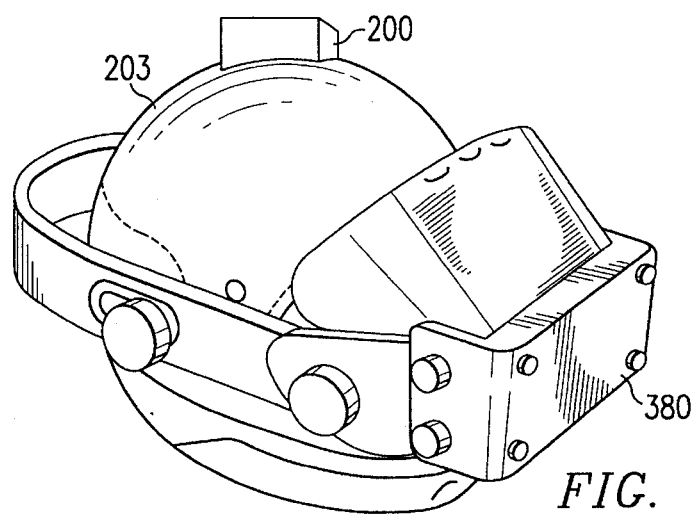
FIG. 9 is a perspective diagram of a helmet device with a flux-gate compass.

As illustrated by FIG. 1, a video collection system 10 is illustrated. The video collection system 10 is for collecting and recording a sequence of images for generating a virtual reality environment. The present invention collects a series of images that may represent a full 360 degree field of vision. The 360 degree field of view is obtained by a plurality of cameras 100 positioned so that the field of vision of all of the cameras receives the images that include the 360 degree field of vision. The cameras may be equally distanced positioned along radius of a circle. The angles between these radius may be equal so that each of the cameras receive an equal portion of the 360 degree field of vision. The images from these cameras are converted to video signals and selected so a respective sequence of images from each camera is produced and this sequence is subsequently recorded in a recording device, for example, a VCR. The cameras continuously receives the images as a transporting device of the cameras traverse a predetermined path at a predetermined rate, for example, along a path for a roller coaster, a highway or a hallway. In this manner, the images and the corresponding video signals change as the scene along the path changes.

These video signals are recorded for playback and displayed at a later time. When these sequence of video signals are received during playback of the VCR, a portion of the video signals are selected to be stored in a memory and subsequently displayed on a display screen. This selected video signals are determined by the number of cameras, and the direction that the user is facing as the VCR is playing back the images. The number of cameras is selected such that the 360 degree full view of vision is achieved. For example, two cameras may be sufficient if each camera has a field of vision of 180 degrees. It is with this scope of invention that the field of vision of each camera overlap. During playback and display, not all of the video signals corresponding to the image received by the cameras are to be displayed at one time. For example, the image at the back of the head of the user are not displayed until the user turns his/her head. However, generally in order to provide a realistic display, the images from at least one camera is required to be displayed on the display. This results in a problem in that the video signal corresponding to multiple images should be combined into the display. This problem is especially evident while the user is looking at a position that is within the field of view of two cameras. Since the video signals for a moving picture includes a number of lines that are included with a frame, each of the lines of the display may include portions of several lines from several cameras. There is an additional problem in merging the lines of the fames to be displayed caused by multiple cameras, and additional problems result from the change of the contribution of the lines from the various cameras to the lines to be displayed. This additional problem is caused by the movement of the user. As the user moves, the contribution of each camera to the line to be displayed changes. As the movement of the user continues, the contribution of one camera may be completely eliminated and a new camera may begin to contribute to the line to be displayed. Thus, the particular combination of cameras contributing to the lines of frame to be displayed may change in accordance with the movement of the user. Moreover, while the actual camera contribution that contributes to the lines or frames of the display remains constant as the user moves, the percentage of a line from a camera contributing to the line or frame to be displayed may change continuously in accordance with the movement of the user. In order to solve the above mentioned problems, the line or frames of the camera contributing to the display may be continuously stored so as the stored lines or frames may be continuously read out the storage and displayed. One method of achieving the above mentioned goals is to continuously store each frame or line that may contribute to the line or frame to be displayed. Additionally, since a sequence of video signals have been recorded and played back, the video signals not contributing to the frames or lines to be displayed may be ignored. However, the display must be continuously supplied with video signals in order not to produce any flicker or discontinues on the display. This requires that lines or frames of the video signals be retained in storage so as to provide a source of video signals as the noncontributing video signals are being played from the VCR. Furthermore, the relative contribution of video signals displayed may be altered as the user moves.

Video signals from two cameras may contribute to the lines or frames of the image displayed. Furthermore, cameras may be employed to record the 360 degree full field of view. However, it is to be understood that any number of image devices may be employed to record the 360 degree full field view. Additionally, more than two image devices may be employed to contribute at any one time to the lines or frames to be displayed by employing additional memory and control circuits.

The image generating devices 100 may be, for example, a series of cameras, which are gen-locked together so that the horizontal and vertical syncs are respectively synthesized. The image generating devices 100 obtain the full 360 field of vision by obtaining video images along a path. The video images obtained from the image generating devices 100 are converted into video signals by the image generating devices 100 and output to the video multiplexing device 110. The image generating devices 100 are controlled to generate a sequence of images. Each of the image generating devices 100 output a frame of a video signal and after the frame is complete, the next image generating devices begins to output a video signal. This sequence of video signals are generated by the sequential operation of the image generating device 100. Advantageously, the image generating devices 100 are arranged to record the full 360 degree field of vision advantageously, the field of vision of the image generating device 100 is limited such that each of the image generating devices 100 is arranged to limit the images received to N divided by 360 degrees where N is the total number of gen-locked cameras. Each of the image generating devices may limit the field of view of the image generating device by optics or alternately the field of view may be limited by software. The video signals from each of the image generating devices 100 are input to switching devices 112, which are controlled by the switch controller 114. Each of the switching devices 112 selects the video signals from the respective image generating device 100 sequentially. The video images from image generating device 100, is output to the multiplexor device 110. The video multiplexor 110 outputs the sequence of image signals to the recording device 170.

FIG. 1 additionally illustrates sync generator 120 to receive the video signals from the image generating devices 100 and to output horizontal sync signals and vertical sync signals to frame/line mode switch 130. Frame/line mode switch 130 controls the address counter 140 in accordance with whether or not frames or lines are desired or selected to be recorded in sequence by the recording device 170.

The frame/line mode switch 130 is a switch that the user switches between a line position to record a sequence of lines from each of the image generating devices 100 and a frame position to record a sequence of frames from each of image generating devices 100.

If lines are desired to be recorded in sequence, the frame/line mode switch 130 connects terminals 132 and 134 to the address counter 140 and the clear device 150, respectively. If frames are desired to be recorded in sequence, the frame/line mode switch 130 connects terminal 136 and terminal 138 to address counter 140 and clear device 150, respectively. In accordance with the position of the frame/line mode switch 130, the address counter 140 receives either the horizontal sync signals or the vertical sync signals to control the switch controller 114. As the sync signals are input to the address counter 140, the address counter 140 increases the count signal, output to switching device 112. As each count signal is input to the switch controller 114, the address counter 140 continues to output the count signals until the sequence of either line frames has been completely recorded by the recording device 170. In order to reset the address count 140, the clear device 150 outputs a clear signal to the address counter 140. The clear signal is output while the frame/line mode switch 130 is positioned in the line position and during a vertical sync signal and during a reset signal output from the counter reset device 160. The clear signal is output while the frame/line mode switch 130 is positioned in the frame position only during a reset signal from the counter reset device 160. The reset signal is output in accordance with the switch 180. The switch 180 is selected by the user to select the number of cameras and the number of frames/lines in the sequence of video signals to output a binary representation of the member of cameras used when the count signal has reached or is equal to the number of image generating devices 100. For example when six image generating devices are to be selected to input video signals and when the count signal has reached six, the counter reset device 160 outputs a logical "one". As the vertical sync signal is input to the address counter 140, the clear device 150 outputs a logical "one" to clear and reset the address counter to zero.

The same sequence is followed while the frame/line mode switch 130 is positioned in the line position.

The switch controller 114 controls the switching devices 112, so that either lines or complete frames from the image generating devices 100 are connected to bus 116 to output the video images to be recorded by the recording device 170. As the count signals are input to the switch controller 114, the count signals control the switch controller 114 to select one of the switch devices 112. Although the switch devices 112 could be selected in any order, the switch device may be selected sequentially from camera 1 to camera 6, in order of the address count signal. As the switch device 112 is selected by the switching controller 114, the video signals output from the image generating device 100 connected to the selected switch device 112 is output to the VCR 170.

The image generating devices 100 generate video signals from image input. The video signals are input to switching device 112, and the switch controller 114 sequentially controls the switching device 112 so that the video signals are output to bus 116 sequentially. For example, FIG. 2 illustrates the time intervals and the output video signals from the image generating devices. The horizontal and vertical sync signals are transmitted to the frame/line mode switch 130. Either the horizontal sync signal or the vertical sync signal is transmitted to the address counter 140. The address counter sequentially addresses the switch controller 114 as the horizontal sync signal or the vertical sync signal is input to the address counter 140. The address counter 140 outputs the count signal as the horizontal sync or vertical sync signal is input. The count signals are also input to the counter reset device 160 through the switch 180, which has been set to the desired number of image generating devices 100. The counter reset device 160, for example an "and" circuit outputs a signal when the last in the sequence of the image generating devices 100 has been recorded for example six. The output of the counter reset device 160 is input to the clear device 150, for example an "or" device. The counter reset device 160 is connected to the clear input of the address counter 140 so that the first image generating device 100 is subsequentially addressed.

Figure 4:
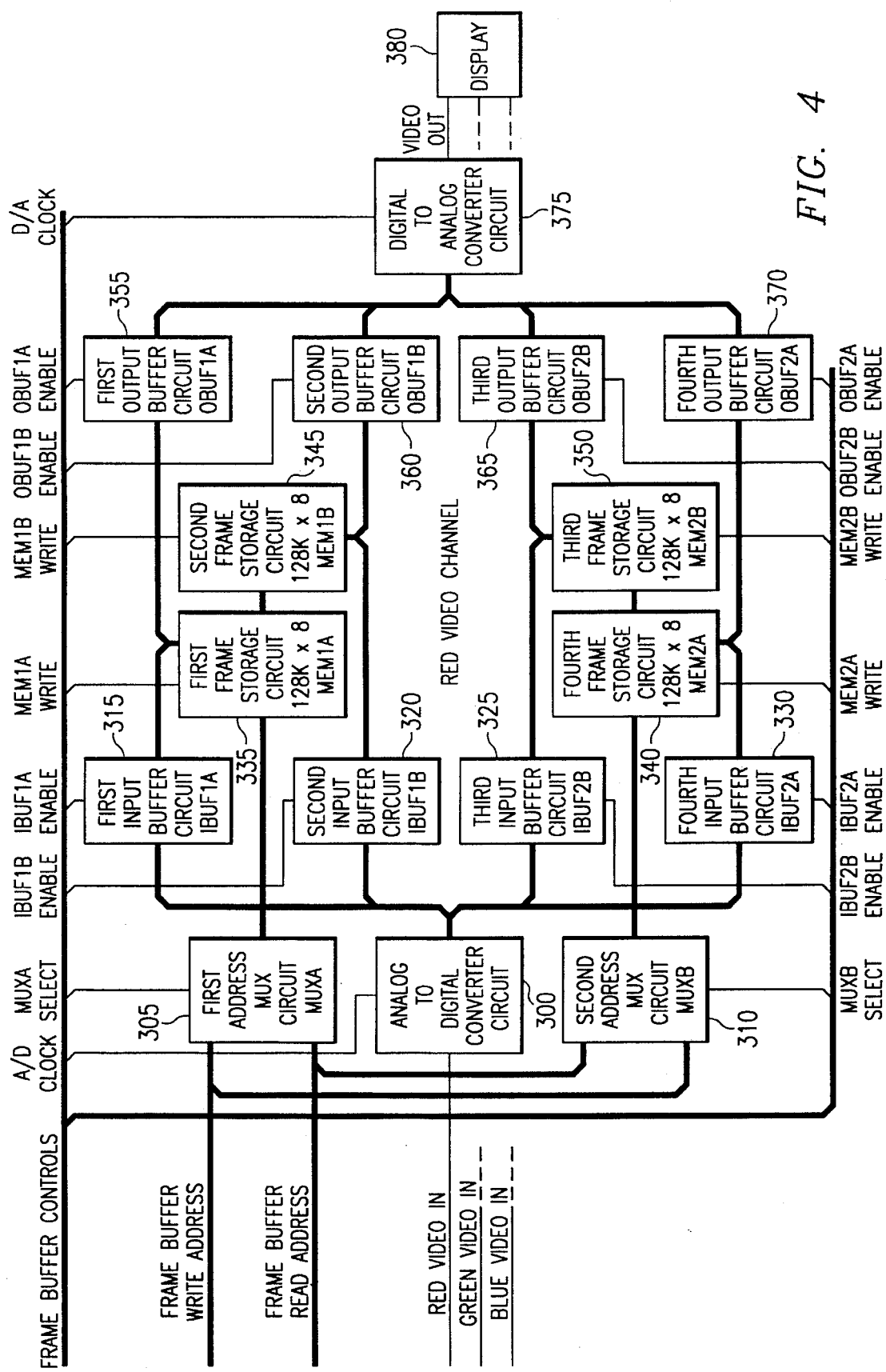
FIG. 4 is a circuit diagram of the present invention illustrating a remaining portion of the playback and display circuit for frame-by-frame display.

FIGS. 3 and 4 illustrate the playback system of the present invention for frame-by-frame playback. The recording device 170 having been previously recorded is set in a playback mode to supply a sequence of frames as illustrated in FIG. 2. For example, frames 1, 2, 3, 4, 5 and 6 have been previously recorded and are output to the sync generator 210 and the connector circuit 250. The directional device 200 positioned on a helmet 203 to be worn by the user to indicate the direction of the user of the virtual reality system outputs a directional signal indicating the direction of the user. The buffer circuit 230 connects the output of the directional device 200 to the processor 220 and to the first read counting device 270, the second read counting device 280 and the read line counting device 260 from the processor 220 by a bus. The sync generator circuit 210 inputs the output of the recording device 170 and inputs the sequence of frames as video signals. The output of the sync generator 210 includes a horizontal sync signal, a vertical sync signal and a frame indicator signal. The horizontal sync signal, the vertical sync signal and the frame indicator signal are input to the processor 220 to generate a control signal to control the interface circuit 240.

The processor 220 outputs to the write counting device 290 the number of pixels in a line of a video signal. The interface circuit 240 employs the write pixel counting device 290 in order to write both the video signal of the first image generating device 100 and the video signal of the second image generating device 100 since the control of the memory is preformed sequentially. After the interface circuit 240 employs the write pixel counter counting device 290 for storage of the video signal of the first image generating device, the interface circuit 240 employs write pixel counting device 290 for storage video signal of the second image generating device. Additionally, interface circuit 240 controls the write line counting device 295 by outputting to the write line counting device 295 a signal to begin a new line at the correct time as indicated by the horizontal sync signal.

The processor 220 controls the read line counting device 260 by outputting to the read line counting device 260 a count of the number of lines in a frame. The processor 220 controls the first read pixel counting device 270 by outputting to the first read pixel counting device 270 the number of pixels from the first video signals of one of the image generating devices 100 in that line to be displayed. The processor 220 controls the second read pixel counting device 280 by outputting to the second read pixel counting device 280 the number of pixels remaining in the line of the second video signal again in accordance with directional signal of the directional device 200. The interface circuit 240 controls the read line counting device 260 by outputting a signal to begin the next line at the correct time. As indicated by the horizontal sync signal the interface circuit 240 receives, from the first counting device 270, a first count down signal when the first read counting device 270 has counted the number of pixels which have been inputted and corresponding to the video signal of the first image generating device 100 in a line. Additionally, the processor 220 receives a second count down signal from the second read counting device 280 when the second read counting device 280 has counted the number of pixels corresponding to the video signal. These first and second read pixel counting devices 270, 280 provide control and timing for the read from memory. Additionally, the interface circuit 240 controls the writing to the frame storage circuits 335, 340, 345 and 350.

The interface circuit 240 controls the first input buffer circuit 315, the second input buffer circuit 320, the third input buffer circuit 325 and the fourth input buffer circuit 330. The interface circuit 240 enables and disables the input buffer circuits 315, 320, 325 and 330 by outputting respective enabling signals, disabling signals and as a consequence of these signals the interface circuit 240 additionally controls first frame storage circuit 335, the second frame storage circuit 345, the third frame storage circuit 350 and the fourth frame storage circuit 340 so that only one of the frame storage circuits 335, 340, 345 and 350 are enabled to store a frame of the video signals at any given time, and the remaining frame storage circuits 335, 340, 345 and 356 are isolated by the remaining input buffer circuits 315, 320, 325 and 330. The interface circuit 240 controls the first output buffer circuit 355, the second output buffer circuit 360, the third output buffer circuit 365 and the fourth output buffer circuit 370 to isolate the respective frame storage circuit 335, 345, 350 and 340 by enable and disable signals so that these circuits output the stored video signals according with the enable signals. The interface circuit 240 controls the A/D converter circuit 300 and the D/A converter circuit 375 to control the input of the red video, green video and blue video signals to the first, second, third and fourth input buffer circuits 315, 320, 325 and 330 to the input of the frame storage circuits 335, 340, 345, 350. Additionally, the interface circuit 240 controls the first address device 305 and the second address device 310 so as to select the address for either the first frame storage circuit 335 and the second frame storage circuit 345 or the fourth frame storage circuit 340 and the third frame storage circuit 350. The read line counting device 260 receives from the processor 220 the count of the total number of lines in a frame and interface circuit 240 outputs a read line counting signal, to indicate the end of the line in order for the next line to be displayed. The first read pixel counting device 270 receives (from processor 220) the number of pixels in the line of the first video signal from the image generating device 100 and outputs the first count down signal when the number of pixels have been read from the frame storage circuit to indicate that the portion of the line corresponding to the first video signal has been displayed from memory. The same function is performed by the second read pixel counting device 280 for the second video signal. The second read counting device 280 receives (from the processor 220) the number of pixels in the line of the second video signal from the image generating device 100. The second read counting device 280 counts from the input count to output a second count down signal to indicate that the remaining pixels corresponding to the second video signal has been read from the frame storage circuit. The read line counting device 260 is controlled by the interface circuit 240 to display the next line. At this point the total number of pixels for a line for a frame to be displayed has been output from the frame storage circuit.

Referring to FIG. 4, the analog to digital converter A/D device 300 converts the analog video signal to digital video signals. Although, the circuit of FIG. 4 illustrates the video channel circuit for a red video signal, it is to be understood that an additional video channel circuits similar to the circuit illustrated in FIG. 4 may be provided for the storage of both the green video and the blue video.

The first address device 305 provides addresses for either the first frame circuits storage 335 and the second frame storage circuit 345 for both reading and writing to these storage circuits. These addresses are provided for the first address device 305 by either the first read pixel counting device 270, the second read pixel counting device 280, the read line counting device 260 or the write pixel counting device 290 and write line counting device 295.

The second address device 310 addresses either the fourth frame storage circuit 340 or the third frame storage circuit 350. These address are provided for the second address device 310 by the first read pixel counting device 270, the second read pixel counting device 280, the read line counting device 260, or the write pixel counting device 290 and the write line counting device 295.

The first input buffer circuit 315 buffers and controls the data, for example pixels of the video signal, to first frame storage circuit 335. The second input buffer circuit 320 buffers and controls the data for example pixels of the video signal to the second frame storage circuit 345. The third input buffer circuit 325 buffers and controls the data for example pixels of the video signal to the third frame storage circuit 350. The fourth input buffer circuit 330 buffers and controls the data for example pixels of the video signals to fourth frame circuit 340. These input buffer circuits are controlled by the enabling signals to enable the input buffer circuit 315, 320, 325 and 330 from the interface device 240.

With six image generating devices 100, the field of view presented to the user either is from only one image generating device 100 or two image generating devices 100. Consequently, a line to be displayed to the user may include pixel information from either one of two these image generating devices 100. As a consequence, the same number of frame storage circuits, namely two frame storage circuits, may be utilized to store the portions of the line corresponding to these two image generating devices 100. Additionally, while these two frame storage circuits written to, additionally two other frame storage circuits may be required to read the previously stored video frame image while the user is turning his head to provide a display of the image. The first frame storage circuit 335 may store a video signal in the form of frames for one of two images from the image generating devices 100. The fourth frame storage circuit 340 having previously stored video frame image now may output video signals in the form of frames for one of the two image generating devices 100. Correspondingly, the first frame storage circuit 335 and the fourth frame storage circuit 340 are alternately read and output the video frame image. The second frame storage circuit 345 stores the video frame from another of the image generating devices 100, and the third frame storage circuit 350 having previously stored a video frame image from another of the two image generating devices 100 may now output the video frame image. Furthermore, since at any time, only one frame storage circuit of the four frame storage circuits (335, 340, 345, 350) is selected for output to the display 380, output buffer circuits control the output from the frame storage circuits so that only one frame storage circuit is selected and output.

This output of the lines of the video signals continue until the entire frame has been output to the display 380. As the output progresses, lines of other video signals are being stored within the third and fourth frame storage circuits (340, 350).

When the first and second frame storage circuits (335 and 345) have completed the output of lines and the third and fourth frame storage circuit 340 and 350 have completed the storage of the video signals, the function of these frame storing circuits are switched such that the video signals are output from the third and fourth storage circuit 340 and 350 while the first and second frame storage circuit 335 and 345 store video signals.

The first output buffer circuit 355 is enabled by the interface circuit 240, and a portion of a line of the video frame image stored in the first frame storage circuit 335 are output to the digital to analog converter circuit 375. The second output buffer circuit 360 is controlled and enabled by the interface circuit 240 so that the remaining portion of the line of the video frame image stored in the second frame storage circuit 345 are output to the digital analog converter circuit 375. The third output buffer circuit 365 is enabled by the interface circuitry 240 so that a portion of a line of the video frame images stored in the third frame storage circuit 350 are output to the digital to analog converter circuit 375. The fourth output buffer circuit 370 is enabled and controlled by the interface circuitry 240 so that the remaining portion of the line of the video frame image stored in the third frame storage circuit 350 is output to the digital to analog converter circuit 375.

The digital to analog converter circuit 375 converts the video frame images that have been stored as video signals and that is output from either the first output buffer circuit 355, the second output buffer circuit 360, the third output buffer circuit 365 or the fourth output buffer circuit 370. The output of the digital to analog converter circuit 375 is combined with the output of the digital to analog converter circuits of the corresponding green and blue channel circuits (not shown) to be displayed by the display, for example, a television or a projection screen positioned within the helmet of the user.

As the video signals representing the sequence of image from image generating devices 100 are output from the recording device 170, the sync generator 210 generates the horizontal sync signals, the vertical sync signals and the frame indicator signals from the sequence of images, and these signals are input to the processor 220 and the interface circuit 240; at the same time, a directional signal from the directional device 200 is input to the processor 220, the first read counting device 270, the second read counting device 280 and the read line counting device 260. The processor 220 determines the relative percentage of contribution of each camera to the line in accordance with the directional signal from the directional device 200. These percentages are transmitted to counting devices 270 and 280. The interface circuit 240 selects a frame storing circuit, for example, the first frame storage circuit 335 for storage of the video signals of the first image generating device 100. The interface circuit 240 enables the first input buffer circuit 315 so that the video signals may be input to the first frame storing circuit 335. The video signals are converted to digital video signals by the digital to analog converter circuit 300 and transmitted to the first frame storage circuit 335. The write pixel counting device 290 outputs a write counting signal to the first address circuit 305 to address the storage locations within the first frame storage circuit 335 to store the video signals from the analog to digital converters circuit 300. At the end of the frame, at vertical sync, the first input buffer circuit 315 is disabled and the second input buffer circuit 320 is enabled to store the second video signal in the second frame storage circuit 345. The write counting device 290 is provided with the number of pixels in a line for the second video signal, and the count from the write counting device 290 again supplies the addresses for storage through the first address circuit 305 for the second frame storage circuit 345 to store the second video signals. The red video signals for the second video signal is input to the second frame storage circuit 345 through the analog digital converter circuit 300 as the first address circuit 305 supplies the address for storage of these video signals in the second frame storage circuit 345. As the user turns his head between the field of view of the first and second image generating devices 100, a different percentage of the first signal to the second signal is generated. The interface circuit 240 switches to storing the pixels of the first and second image generating device 100 into the third and fourth frame storage circuit 340 and 350. Thus, the first frame storage 335 and the second frame storage circuit 245 are now ready to have the first and second video signals read from these frame storing devices. A count corresponding to the percentage of the first video signals in a line is input to the first read counting device 270 by the processor 220, and a count corresponding to the percentage of the second video signal in the line is input to the second read counting device 280 by the processor 220 and in accordance with the directional device 200. Additionally, a count corresponding to the total number of pixels in a line of both the first video signal and the second video signal is input to the read line counting device 260.

As the first read counting device 270 counts down, these counts are input to the first address circuit 305 to provide addresses for the first frame storage circuit 335. The interface circuit 240 enables the fourth output buffer circuit 370 to output the stored pixels of the fourth frame storage circuit 340. After the first counting device 270 has reached the inputted count, the second read counting device 280 begins counting and the counts are output to the first address circuit 305 to address the second frame storage circuit 345. The interface circuit 240 enables the third output buffer circuit 350 to output and display the remaining pixels for the line and the horizontal sync signal as the line is completed. This process is continued until the entire frame has been output from the collective storage of the fourth frames storage circuit 340 and the third frame storage circuit 350.

Figure 5:
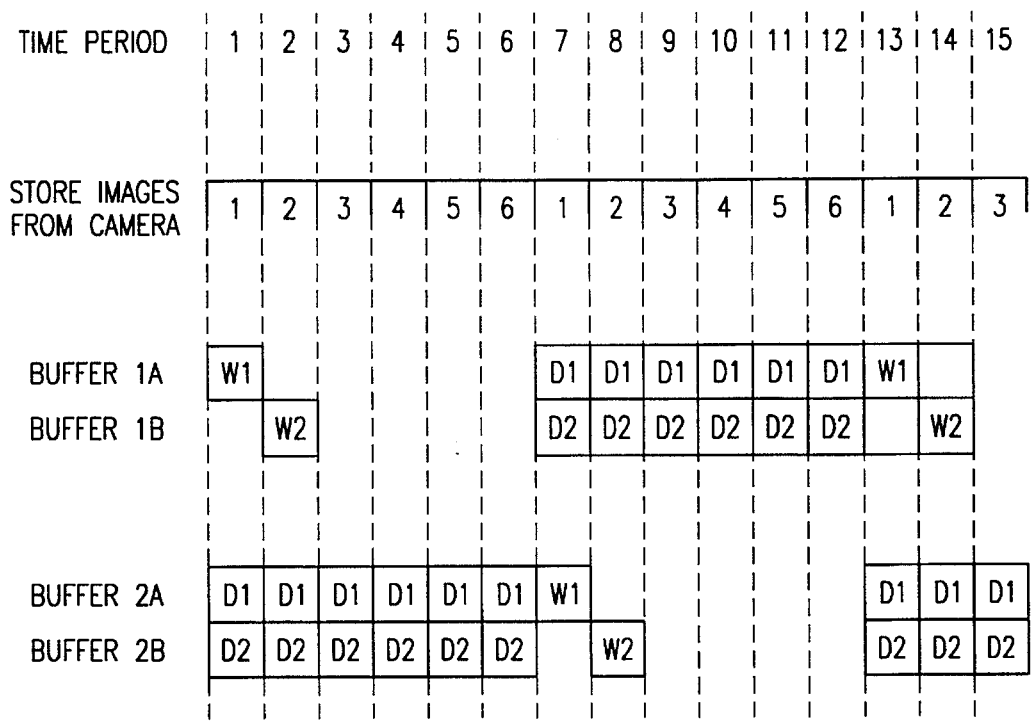
FIG. 5 is a timing diagram illustrating time intervals, and the operation of the buffers to control the storage and output of image data when the field of view of the user is within two cameras.

FIG. 5 illustrates the timing of buffers that are activated to output and display information during various time periods. FIG. 5 illustrates the sequence when the user is not turning his head, but the view is changing.

FIG. 5 illustrates that in time interval 1, the image from the first camera of the image generating devices 100 is written to the first frame storage circuit 335 by enabling the first input buffer circuit 315. During time interval 2, the second video image from the image generating devices 100 is written to the second frame storage circuit 345 by enabling the second input buffer circuit 320. While the images for the third-sixth video signals from the image generating devices 100, which are not stored since the user is viewing the objects within the first and second camera of the image generating device, are output from the recording device 170, the third and fourth frame storage circuit 340 and 350 alternately output the previously stored first and second video image by activating the third output buffer circuit 365 and the fourth output buffer circuit 370 during the time intervals 7-12. The function of the first and second frame storage circuit 335 and 345 is to store video signals while the function of the third and fourth frame storage circuits 350 and 360 is to output video signals. The function of the first frame storage circuit 335 and the second frame storage circuit 345 switches with the third and fourth frames storage circuits 340 and 350.

Figure 6:
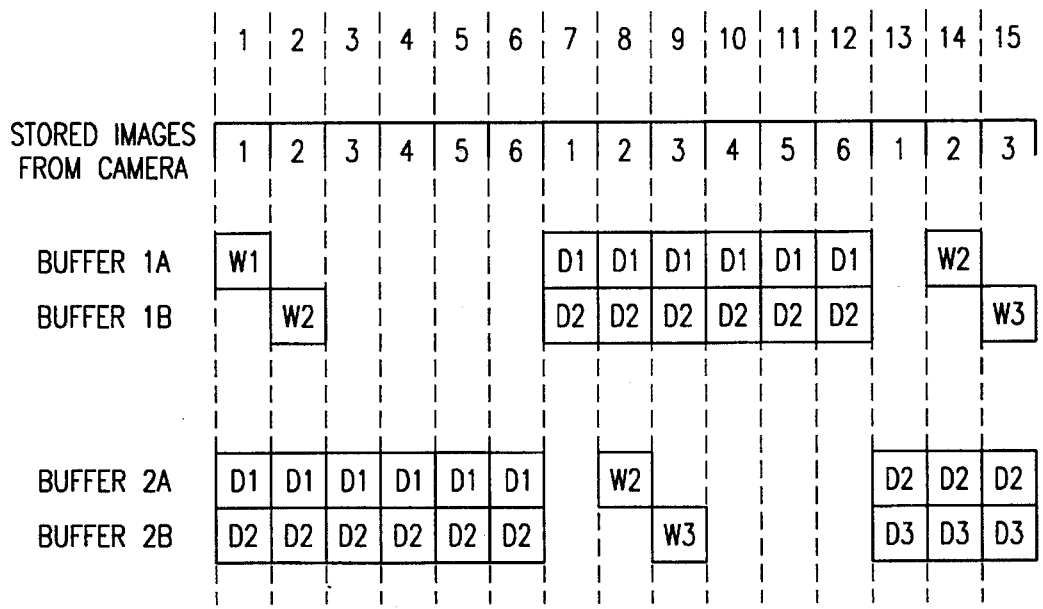
FIG. 6 is a diagram timing illustrating time interval and the operation of the buffers to control the storage and output of image data when movement within the field of view of the user is within three cameras.

FIG. 6 is similar to FIG. 5 with the additional feature during the time intervals 1–6, the user has turned his head from between the field of view of the first and second camera of the image generating devices 100 to the field of view between the second and third cameras of the image generating devices. As illustrated in FIG. 6, the second and third video signal from the second and third camera of the image generating devices are stored during the eighth and ninth time interval in the third and fourth frames storage circuit 340, 350. The first and second frame storage circuit 335 and 345 store the second and third video signals from the second and third camera of the image generating devices 100 during the fourteenth and fifteenth time interval. Thus, as the user turns his/her head from the field of view of the first and second image generating device to the second and third image generating device the video signals stored correspondingly changes.

Figure 7:
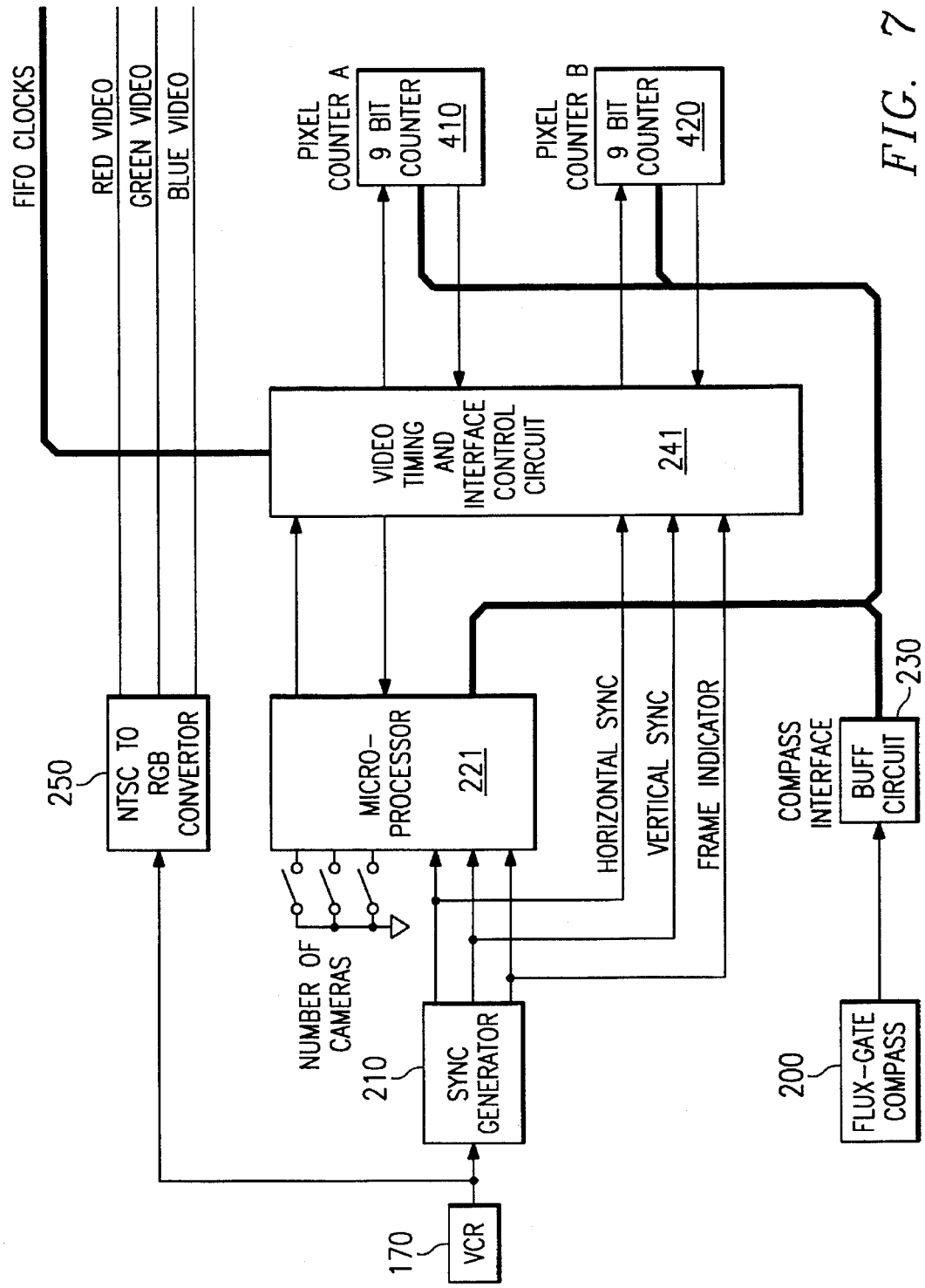
FIG. 7 is a circuit diagram illustrating a portion of a display circuit for line-by-line display.
Figure 8:
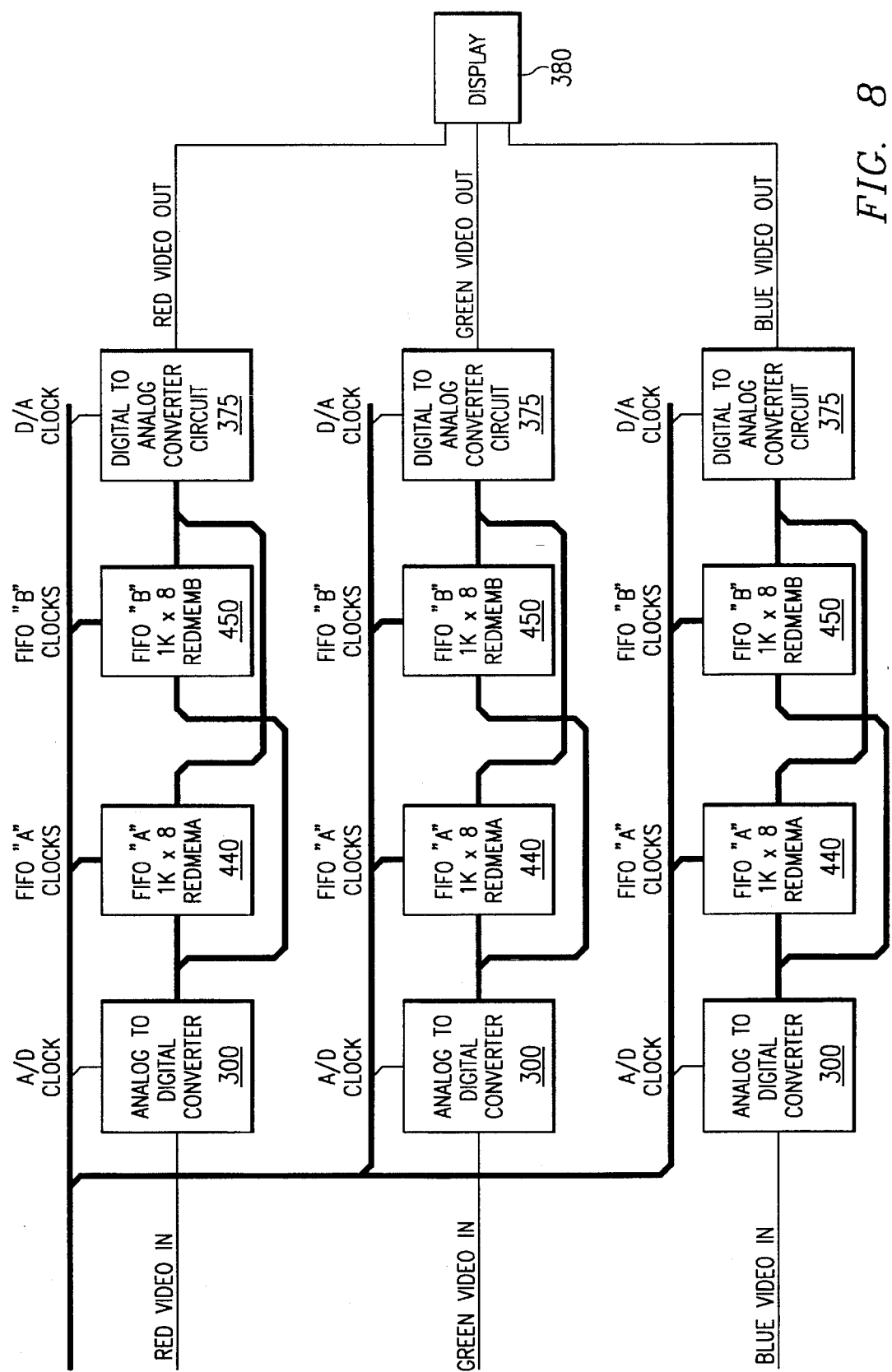
FIG. 8 is a circuit diagram illustrating the remaining portion of the display circuit for line-by-line display.

FIG. 7 and 8 illustrate the playback system with line-by-line storage.

As illustrated in FIG. 7, the processor 221 controls the interface circuit 241. The interface circuit 241 activates the first line storage circuit 440, for example a FIFO storage circuit, and the second line storage circuit 450, again for example a FIFO storage circuit, by the respective clock signals, for example the FIFO "A" clock signals FIFO storage circuit 440 to store a portion of a line of the first video signal from the image generating device 100 and FIFO "B" clock signal FIFO storage circuit 450 to store the remaining portion of the line of the second video signals from the image generating device 100 respectively as the first video signals and the second video signals are respectively output from the recording device 170. As other video signals are output from the recording device 170, the first line storage circuit 440 and the second line storage circuit 450 are inactivated so that this video information is not stored.

Each color, namely red, green and blue, have a separate channel to store the lines from the first and second video signals.

The processor 221 outputs to the first pixel counting device 410 a first count signal corresponding to the number of pixels in a line from the first video signal and outputs to the second pixel counting device 420 a second count signal corresponding to the number of pixels remaining in the line for the second video signal. As the directional device 200 changes direction, the count of pixel counting device 410 and second pixel counting device 420 changes so that the number of pixels for the line stored in the first line storage circuit 440 and the remaining number of pixels are stored for the line stored in the second line storage circuit is constantly changing in accordance with the direction from the directional device 200.

The pixel counting device 410 counts the number of pixels of the first video signal and provides a first pixel signal to the interface circuitry 241 when the count has been reached. The second pixel counting circuit counts the number of pixels of the second video signal from image generating device 100 and provides a second pixel signal to the interface circuitry 241.

Referring now to FIG. 8, the first line storage circuit 440 stores pixels of the first video of the image generating device in accordance with a control signal for example the FIFO "A" clock signal from the interface circuit 241. Additionally, the first line storage circuit 440 reads out a portion of the line of the first video signal, for example pixels, to the digital to analog converter circuit 375 in accordance with the second pixel signal. Likewise, the second line storage circuit 450 stores the remaining portion of the line of the second video signal. Additionally, the second line storage circuit 450 outputs the remaining portion of the line of the second video signal in accordance with the first pixel signal from the first pixel counting device 410 to the digital to analog converter circuit 375.

In response to the interface device 241 receiving the horizontal sync signal, the first pixel counting device 410 counts the number of pixels in a line from the first video signal, the first pixel counting device 410 outputs the first pixel signal to the interface device 241. When the interface circuit 241 receives the first pixel signal, the interface device 241 outputs the control signal, for example the FIFO "A" clock signal to first line storage circuit 440 to activate the circuit 440. When the storage in first line storage circuit 440 is complete and to activate the second line storage circuit 450 to begin storage of the second video signals, the first pixel signal is output to the interface device 241. When the first pixel signal is received by the interface device 241, the second count signal is output to the second pixel counting device 420. The interface device 241 output a control signal for example FIFO "B" clock signal to the second line storage circuit 450 to activate the circuit 450. When the second pixel counting device 420 has counted the number of pixels remaining in the line, the second pixel counting device 240 outputs the second pixel signal to the interface device 241 to terminate the storage of the second video signal in the second line storage circuit 450. As the third, fourth, fifth and sixth video signals are output from the recording device 170, neither the first line storage circuit 440, nor the second line storage circuit 450 is activated for storage of these video signals.

Since the first line storage circuit 440 and the second line storage circuit 450 have separate read and write addresses, the first line storage circuit 440 and the second line storage circuit 450 can be read out continuously through the digital to analogue converter circuit 375 so that the output of the digital analog converter circuit 375 is displayed on the displayed device 380.

FIG. 8 illustrates that the red, green and blue video signals are stored and output from the first line storage circuit 440 and the second line storage circuit 450 respectively to form a composite display 380. The playback system using the line-by-line storage of FIG. 7 and 8 provides a less complicated system than the playback system of FIGS. 3 and 4.

Other Embodiments

Although the present invention and its advantages have been described in detail, it should be understood that various changes, substitutions and alterations can be made herein without departing from the spirit and scope of the invention as defined by the appended claims.

What is claimed is:

1. A system for sequentially recording a sequence of video images, comprising:
    circuitry for obtaining a plurality of different and complete video images, each of said different video images being of a different field of view to form a 360 degree scene;
    circuitry for controlling said circuitry for obtaining said plurality of different video images, to select a portion of said plurality of different video images corresponding to a selected number of said plurality of different video images;

circuitry to control the selection of said portion of said plurality of different video images by selecting either lines or frames of said plurality of different video images;

circuitry to output said portion of said plurality of different video images corresponding to said selected number of said plurality of said different video images;

circuitry to sequentially record said portion of said plurality of different video images corresponding to said selected number of said plurality of different video images to form said sequence of video images.

2. A system for sequentially recording a sequence of video images as in claim 1, wherein said circuitry for controlling said circuitry for obtaining said plurality of different video images includes switching circuitry to switch between said plurality of different video images.

3. A system for sequentially recording a sequence of video image as in claim 1, wherein said circuitry for obtaining a plurality of different video images includes circuit for gen locking a plurality of cameras.

4. A method for sequentially recording a sequence of video images, comprising the steps of:

obtaining a plurality of different video images, each of said different video image being of a different field of view to form a 360 degree scene;

controlling said obtaining said plurality of different video image to select a portion of said plurality of different video images corresponding to a selected number of said plurality of said different video images;

selecting either lines or frames from said portion of said plurality of said different video image;

outputting said portion said plurality of different video images corresponding to said selected number of said plurality of said different video images;

recording sequentially said portion of said plurality of said different video images corresponding to said selected number of said plurality of different video images to form said sequence of video images.

5. A method for sequentially recording a sequence of video images as in claim 4, wherein said step of controlling to select said portion of said plurality of different video signals includes the step of switching between the plurality of different video images.

6. A method for sequentially recording a sequence of video images as in claim 4, wherein said step of obtaining includes the step of gen locking a plurality of cameras to obtain said plurality of video images.

* * * * *